United States Patent [19]

Hamada et al.

[11] Patent Number: 4,987,527
[45] Date of Patent: Jan. 22, 1991

[54] PERSPECTIVE DISPLAY DEVICE FOR DISPLAYING AND MANIPULATING 2-D OR 3-D CURSOR, 3-D OBJECT AND ASSOCIATED MARK POSITION

[75] Inventors: Tomoyuki Hamada; Kohzi Kamezima; Ikuo Takeuchi, all of Ibaraki; Yuriko Watanabe, Tokyo, all of Japan

[73] Assignee: Hitachi, Ltd., Tokyo, Japan

[21] Appl. No.: 261,498

[22] Filed: Oct. 24, 1988

[30] Foreign Application Priority Data

Oct. 26, 1987 [JP] Japan .................................. 62-268167
Oct. 26, 1987 [JP] Japan .................................. 62-269833
Oct. 26, 1987 [JP] Japan .................................. 62-269834

[51] Int. Cl.⁵ .................... G05B 19/18; G05B 19/42; G05B 19/405; G06F 3/033
[52] U.S. Cl. .......................... 364/167.01; 340/709; 364/522
[58] Field of Search ............... 340/709; 364/167.01, 364/521, 522

[56] References Cited

U.S. PATENT DOCUMENTS

| | | | |
|---|---|---|---|
| 4,698,625 | 10/1987 | McCaskill et al. | 340/709 |
| 4,791,478 | 12/1988 | Tredwell at al. | 340/709 X |
| 4,812,829 | 3/1989 | Ebina et al. | 340/709 |
| 4,835,528 | 5/1989 | Flinchbaugh | 340/709 |

FOREIGN PATENT DOCUMENTS

| | | | |
|---|---|---|---|
| 0213316 | 3/1987 | European Pat. Off. | 340/709 |
| 0097409 | 5/1985 | Japan . | |
| 0079589 | 4/1986 | Japan . | |
| 0177578 | 8/1986 | Japan . | |
| 0199108 | 9/1986 | Japan . | |
| 0114022 | 5/1987 | Japan | 340/709 |

OTHER PUBLICATIONS

LOGICADD ™ User's Manual, Generic CADD T-M—Version 3.0, Generic Software, Inc. Redmond, Wash., Apr. 1987, 4–114–116, 4–123, 4–126–7, 4–133.
Orr, J. N. "Upwardly Mobile CADD", *PC Magazine*, vol. 6, No. 21, Dec. 8, 1987, 93.

Primary Examiner—Clark A. Jablon
Attorney, Agent, or Firm—Antonelli, Terry, Stout & Kraus

[57] ABSTRACT

A manual operating system for manually operating a pattern displayed on a screen of a graphics display device, which is included in the manual operating system so as to display generated patterns comprises perspective projection means for displaying the cursor, object and mark in perspective projection on the basis of information supplied from cursor information storage means and object information storage means.

8 Claims, 8 Drawing Sheets

| POSITION OF CURSOR | COORDINATES OF POINTS | LINKS OF POINTS |
|---|---|---|
| (10, 20, 35) | $P_1(5,5,0)$<br>$P_2(-5,5,0)$<br>$P_3(-5,-5,0)$ | $P_1 - P_2$<br>$P_2 - P_3$ |

2001 / 2002 / 2003

PERSPECTIVE DISPLAY DEVICE FOR DISPLAYING AND MANIPULATING 2-D OR 3-D CURSOR, 3-D OBJECT AND ASSOCIATED MARK POSITION

BACKGROUND OF THE INVENTION

The present invention relates to a manual operating system for a locomotive body such as a robot, and in particular to a manual operating system for providing a locomotive body such as a robot with motions in a short time by using simple manual operating highly intelligent processor.

Conventional methods for providing a robot with motions will now be described. In the direct teaching method, positions are memorized while moving an actual robot by using a teaching box coupled to a control device of the robot or a human hand, and the memorized positions are successively read out to provide the robot with the motions. In an alternative method, motions are described in the form of program by using a robot language or the like, and a robot is moved by the program. In the master-slave method, an arm for manual operation (i.e., a master arm) is provided, and a robot is moved by interlocking the master arm with the motion of the robot. In a manual operating system using a computer, manual operation is performed by using a robot displayed on a screen of the computer as the master arm as described in JP-A-61-79589, or teaching is performed with respect to a robot on the screen by means of direct teaching as described in JP-A-61-177578. Or a drawing of a working object is displayed on a screen, and the position and posture are calculated on the basis of a point on that drawing specified by coordinate values or the like as described in JP-A-61-199108 and JP-A-97409.

The above described conventional techniques have problems as described below.

First of all, in the direct teaching method, a large number of positions must be taught for providing a robot with one motion, and respective positions must be given accurately, a large amount of labor and time being required for teaching.

In a method using a robot language, it is difficult to imagine the actual motion of the robot because the motion is described by using characters and numeric values. In addition, the manual operator must be acquainted with grammar of the language, agreement of the coordinate system, and transformation procedure of the coordinate system. And high degree of knowledge and consideration are required for providing desired motions.

On the other hand, it is possible to provide a robot with motions simply when the master-slave method is used. Since motions of the human hand become motions of the robot as they are, however, failure is not permitted. Further, when motions including precise positioning are to be given, the manual operator must pay sufficient attention and must be skilled in manual operation.

Many of systems in which robots are manually operated by using computers have simulation function of reproducing taught motions on the screen to make the operator confirm the motions. In many of such systems, function of providing a robot with motions is obtained by only replacing a robot or a master arm for teaching with a robot on the screen. The problem that accurate positions and detailed motions must be given by some means is not lightened. Further, in the simulation of motions, motions obtained when the robot moves accurately in accordance with the motion data are reproduced. In no systems, accurate reproduction of motions is performed with due regard to the effect of inertial force caused by the weight of the robot and the weight of the object held by the robot.

SUMMARY OF THE INVENTION

An object of the present invention is to provide a manual operating system capable of giving desired motions in a short time by operation means which is simple and easy to understand without the necessity of giving accurate positions and detailed motions.

Another object of the present invention is to provide a manual operating system capable of reproducing accurate motion of a robot with the effect of inertial force included before actually moving the robot, and of manually operating the robot safely.

A further object of the present invention is to provide a manual operating system capable of easily selecting three-dimentionally arranged objects.

In accordance with the present invention, therefore, a manual operating system for manually operating a pattern displayed on a screen of a graphics display device, which is included in the manual operating system so as to display generated patterns, comprises cursor information storage means for storing shape and 3-dimensional position information of a cursor, object information storage means for storing a 3-dimensional position and a shape of an object to be selected as well as a mark position corresponding to the object, and perspective projection display means for displaying the cursor, the object and the mark in perspective projection on the basis of information supplied from the above described cursor information storage means and the above described object information storage means and for displaying the result on the above described graphics display device.

DESCRIPTION OF THE PREFERRED EMBODIMENTS

Figure 1:
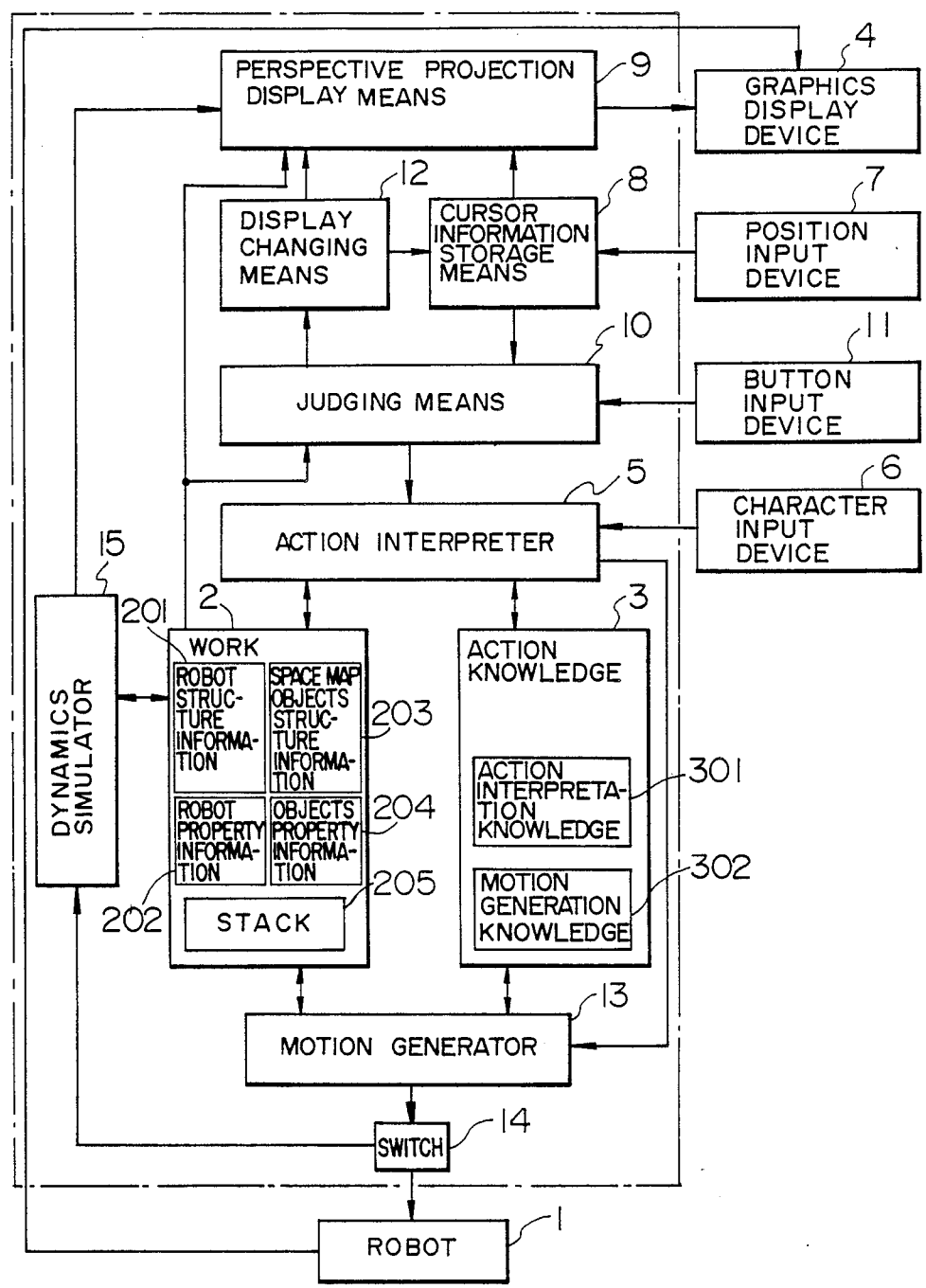
FIG. 1 is an entire configuration diagram showing an embodiment of a system according to the present invention.

Embodiments of the present invention will now be described by referring to the drawings.

FIG. 1 shows the entire configuration of an embodiment of the present invention. In FIG. 1, numeral 1 denotes a locomotive object manually operated by this system, and denotes a robot in this example.

Numeral 2 denotes a work space map. In the work space map 2, structure information 201 of the robot manually operated by this system, property information 202 of the robot, structure information 203 of objects such as an object to be handled and obstacles existing in the work space in which the robot works, and property information 204 of those objects are stored. The work space map 2 has a stack 205 as well. Numeral 3 denotes action knowledge. In the action knowledge 3, action interpretation knowledge 301 and motion generation knowledge 302 are stored.

Numeral 4 denotes a graphics display device. On the basis of structure information 201 and 203 of the robot and objects, the graphics display device 4 displays the robot and the objects as specified by the work space map 2 and the cursor in perspective projection seen from a point of view.

Numeral 5 denotes an action interpreter. According to an action name specified by using a character input device 6, the action interpreter 5 derives a reference point, which should be specified by the operator in the action directive, utilizing the action interpretation knowledge 301 relating to the action stored in the action knowledge 3. The action interpreter 5 derives the concrete three-dimensional position coordinates of the reference point by using the work space map 1 and suitably displays the coordinates thus derived on the screen of the display device 4. When an action directive is completed, the action interpreter 5 delivers an action message corresponding to the action directive to a motion generator 13.

Figures 2, 3:
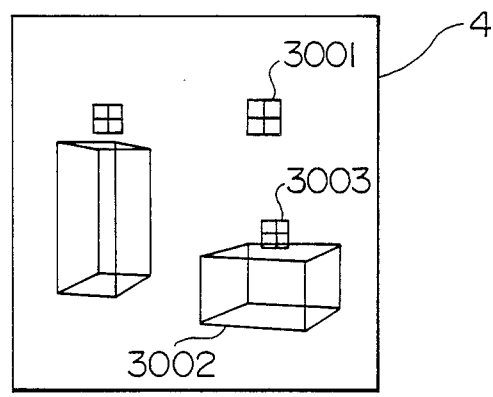
FIG. 2 illustrates contents of cursor information storage means according to the present invention.
FIG. 3 illustrates patterns displayed on a screen of a display device.
Figure 4:
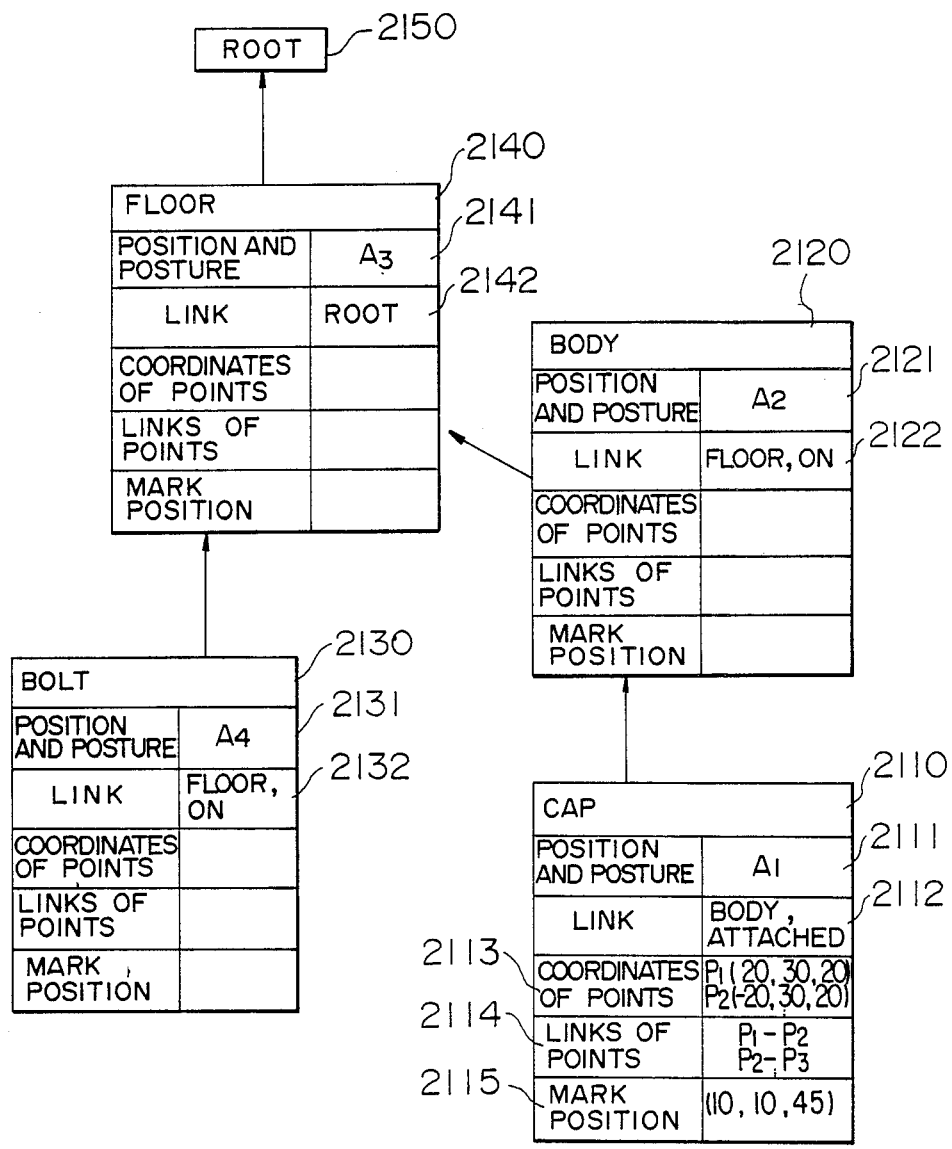
FIG. 4 shows configuration of a map according to the present invention.

The character input device 6 needs only supply a command and an action name to the action interpreter 5. Therefore, the character input means 6 may be a device such as a keyboard having buttons arranged thereon or may be so configured that desired one may be selected by position input means, which will be described later, out of a menu displayed on the screen of the display device 4. Numeral 7 denotes a three-dimensional position input device such as a three-dimensional joystick, which continuously outputs displacements $\Delta s$, $\Delta y$ and $\Delta z$ respectively of x, y and z axis directions in the space in accordance with manual operation of the device. Numeral 8 denotes cursor information storage means. In the cursor information storage means 8, the current three-dimensional position 2001 of the cursor (hereafter referred to simply as cursor position), coordinates of points 2002 which are shape data representing a three-dimensional shape, and links of points 2003 are stored. By adding values of the cursor position 2001 to respective values of relative coordinates 2002, absolute coordinate values in the three-dimensional space are obtained. By connecting points with segments of lines in accordance with specified links of points 2003, a pattern as illustrated in FIG. 3 such as a pattern 3001 is formed. The value of the cursor position 2001 is continuously rewritten by adding the output value of the position input device 7 thereto. In the object structure information 203 included in the work space map 2, respective objects are represented by nodes 2110, 2120 and 2130. Information contained in □ associated with each object in FIG. 4 is referred to as node. In the nodes 2110, 2120 and 2130, positions of respective objects are described by relative position and posture parameters 2111, 2121 and 2131 with respect to objects 2120 and 2140 respectively supporting the objects represented by the nodes.

For example, objects existing on the floor are supported by the floor, and objects attached to other parts are supported by those parts. Objects supporting respective objects are described by links 2112, 2122 and 2132 as shown in FIG. 4. The concrete position of a certain object is derived by starting from the node of that object, tracing the links up to a root node 2150, and synthesizing all of position and posture parameters of objects on the way.

If $4 \times 4$ matrixes $A_1$ representing parallel transfer and rotational transfer values are used as position and posture parameters, matrix A representing the concrete position and posture of the cap 2110 shown in FIG. 4 is derived as $$A = A_1 A_2 A_3.$$

Further, in each node, coordinates 2113 of points, links 2114 of points, and mark position 2115 are stored. The mark position 2115 may be calculated by using the action knowledge 3 or may be derived from the property information 204 of the objects. The relation between the position of an object and coordinates 2113 and links 2114 is similar to that of the cursor information, which relation is calculated from the above described links of objects and position and posture paramters, and therefrom an object pattern such as 3002 shown in FIG. 3 is formed. Further, the absolute coordinates of a mark 3003 are derived by adding the position of an object to the value of the mark position 2115. On the basis of the above described position information and point link, perspective projection display means 9 shown in FIG. 1 displays the shapes of the cursor 3001, the object 3002 and its mark 3003, and generates patterns in perspective projection on the graphics display device 4. However, the shape data 2002 and 2003 of the cursor 3001 are used in substitution for the shape of the mark 3003. When a button input is supplied from an input device 11, judging means 10 compares the cursor position 2001 and the absolute position of the mark 3003, finds out the nearest mark among marks existing in a certain distance from the cursor, and outputs an object number corresponding to the nearest mark. Display changing means 12 changes the color of the object selected by the judging means 10 and demand the perspective projection display means to cause a blinking display. At the same time, the display changing means 12 changes the display to make the cursor position coincide with the selected mark position of the object.

On the basis of the action message supplied by the action interpreter 5, the motion 13 generates concrete motion data capable of driving the robot by using the work space map 2 and the motion generation knowledge 302.

A changeover switch 14 is provided for delivering the above described motion data toward a simulator when simulation carried out by a dynamics simulator 15 is needed before the actual robot 1 is moved by the motion data.

By solving equations of motion by using the weight, moment of inertia and the like included in the structure information 201 and the property information 202 of the robot stored in the work space map 2, the dynamics simulator 15 simulates behavior of the robot, which is obtained when the robot is moved in accordance with the motion data supplied from the motion generator 13, with due regard to dynamical factors and displays the result on the screen of the display device 4 as motions of the robot 3010.

The robot structure information 201 contains shapes, position, postures and linkage information for each link part of the robot 1 in the similar way to the objects structure information 203. When the cursor position is rewritten, the positions and postures in the robot structure information 201 are also rewritten so that the gripper position of the robot coincides with the cursor position. Therefore, the robot displayed on the graphics display moves interlocked with the cursor movement.

The operation of the manual operating system according to the present invention will now be described.

Figure 5:
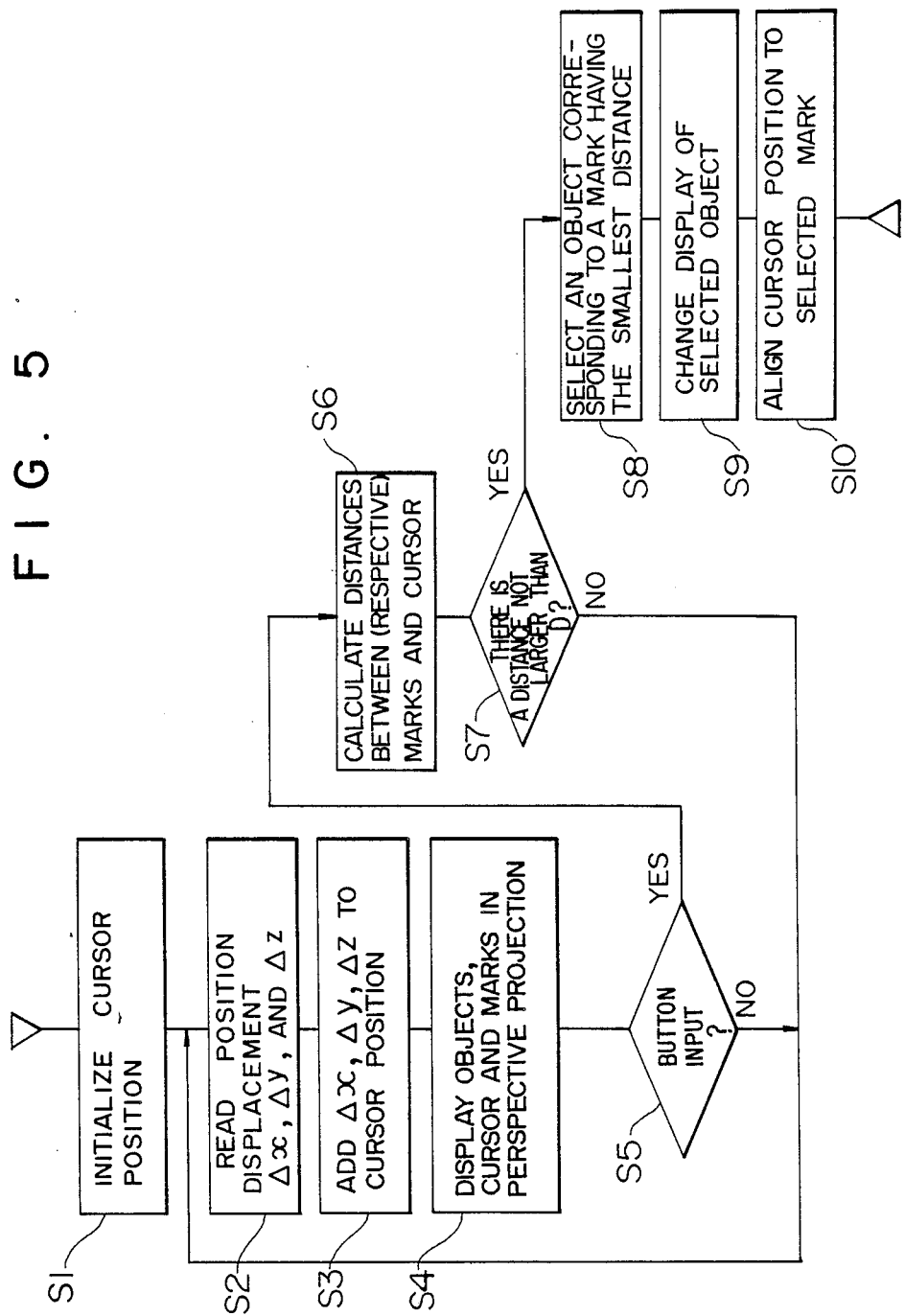
FIG. 5 is a flowchart showing the procedure of selection processing.
Figure 6:
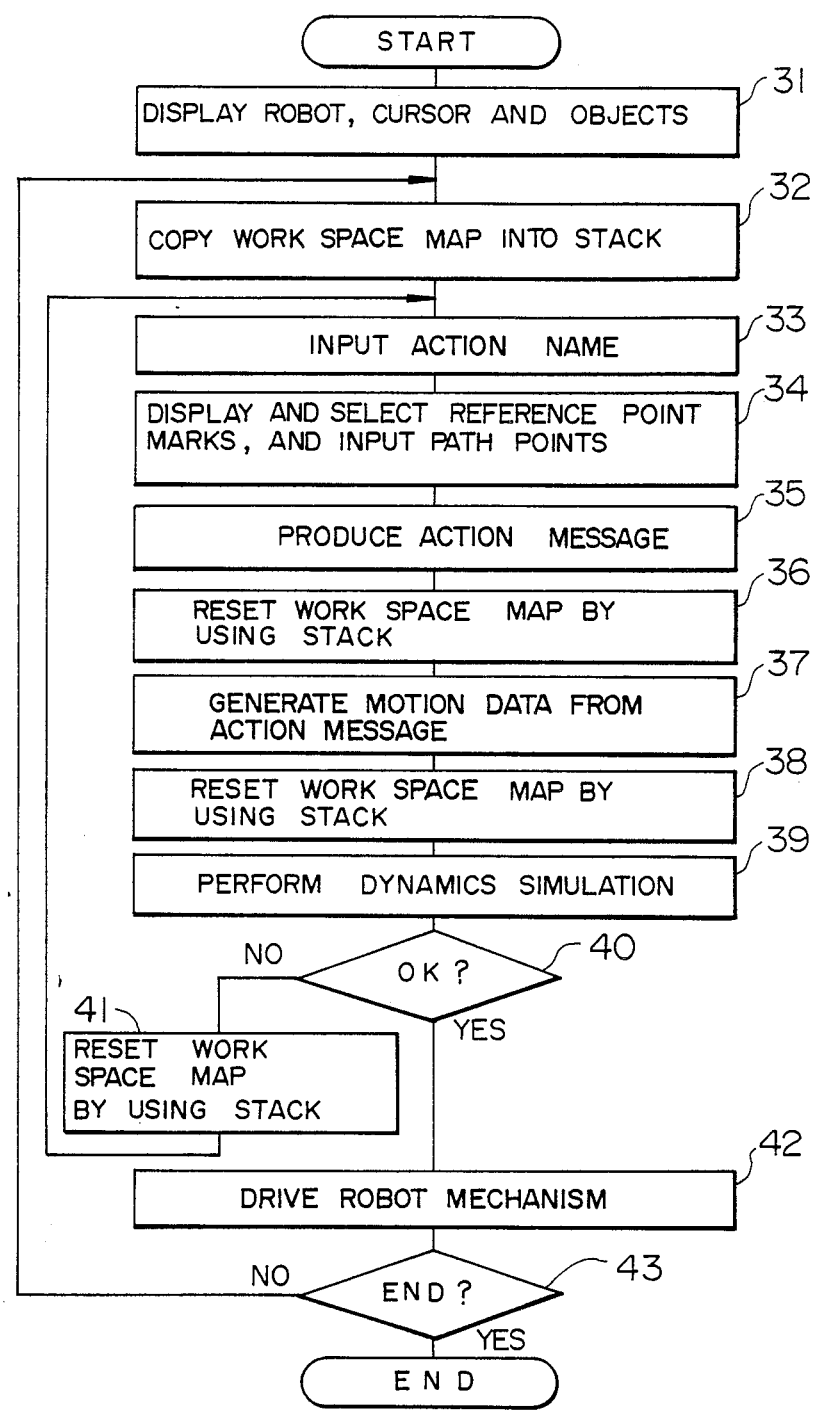
FIG. 6 is a flowchart illustrating input procedure of an action directive according to the present invention.

First of all, manual operation of the cursor will now be described by referring to a flowchart shown in FIG. 5.

When this selection method is called by main program, the cursor position 2001 is initialized (S1). Displacement of position is read from the position input device 7 (S2), and added to the cursor position 2001 (S3) and displayed in perspective projection by perspective projection means 9 (S4). Here, the input of the button input device 11 is examined. If the input button is not depressed, the program returns to the step S1 to repeat processing.

As a result, the cursor 3001 moves while it is being interlocked with the manual operation at the position input device 7.

If a button is depressed, the three-dimensional distances between the cursor position 2001 and respective object mark positions are calculated (S6). If there is a distance not larger than a certain value D (S7), an object corresponding to a mark having the smallest distance is found (S8), and the color of the display of the object is changed.

This is achieved by rewriting only a selected object with a different color (S9). In addition, the position of the cursor is aligned with the mark position of the selected object displayed (S10). At this step, the display changing means may eliminate other marks to mark the selected object more distinct, and the result is displayed (S10).

In accordance with this manual operation of the cursor, not only the object but also the cursor and the mark are displayed in perspective projection. Since the three-dimensional shape of the cursor is the same as that of the mark, it is possible to grasp whether the cursor is beyond or this side of the mark by comparing the sizes of them on the screen. Even if the mark and the cursor are not located at a completely identical position in judging selection, selection can be easily performed by alignment of size comparison grade because a mark having the shortest distance is selected out of marks having distances from the cursor which are not larger than a certain value. Further, it is possible to confirm that selection has been properly done from the fact that the mark of the selected object coincides with the cursor and the display of the object is changed.

The procedure for manually operating the robot by using the system according to the present embodiment will now be described concretely by referring to FIGS. 6 to 10.

First of all, the display device 4 displays objects 3020, 3030 and 3040 on the screen by using the structure information 203 of objects included in the work space map 2, and displays the robot 3010 and the cursor 3001 by using the position supplied from the position input means 7 and the structure information 201 of the robot.

Figure 7:
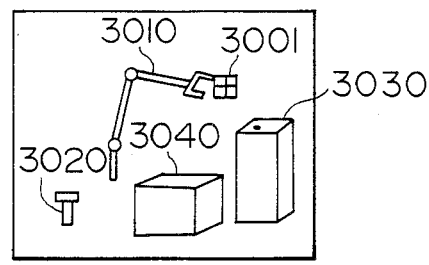
FIGS. 7 to 10 show screens of the graphics display device changing with input of action directives.

In order to maintain the current state of the work space map 2, contents of the structure information 201 of the robot and the structure information 203 of objects are copied into the stack region 205. The operator watches this screen, determines action to be performed by the robot 1, and inputs the action name by using the character input means 6. It is now assumed that the image shown in FIG. 7 is displayed on the screen and the action to be done by the robot 1 is to attach a bolt 3020 to a part 3030.

Figure 8:
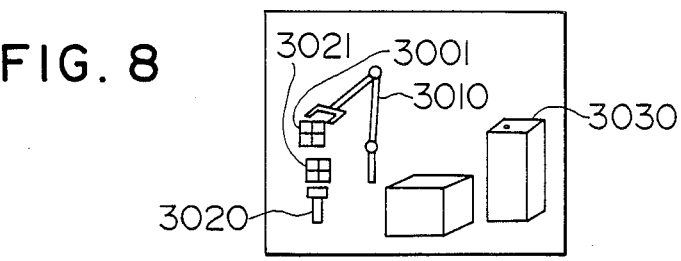
Figure 11:
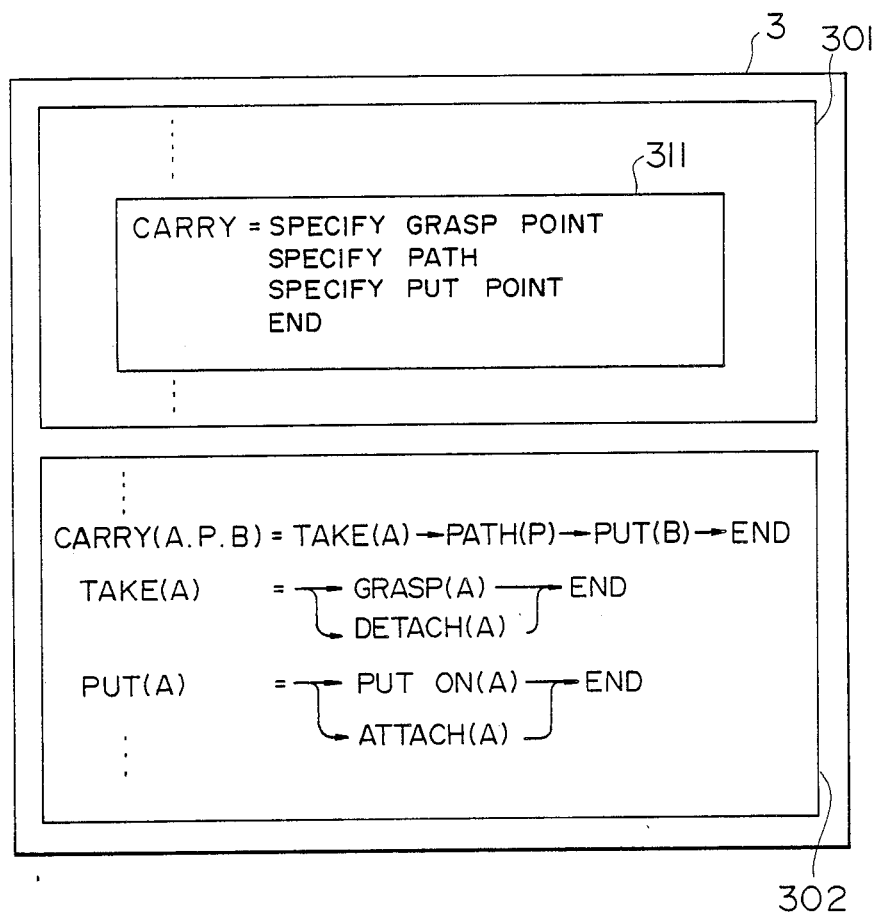
FIG. 11 illustrates contents of action knowledge.

The operator inputs working name "CARRY" into the action interpreter 5 by using the character input means 4. The action interpreter 5 looks for description 311 relating to "CARRY" in the action interpretation knowledge 301 as shown in FIG. 11, and displays the position of the grasp point of each object on the screen of the display device 4 as the mark 3021 on the basis of the description thus found (FIG. 8). This grasp point means that the object can be grasped at that point, and is derived from the property information 204 of objects. To be concrete, the grasp point can be derived by describing in the property information 204 of objects that the bolt comprises a hexagonal pillar and a column and by preparing in the action knowledge 3 a rule that if there is a polygonal pillar having a width smaller than the maximum opening width of the gripper of the robot the bolt can be grasped at that polygonal pillar portion. Or as the simplest method, the concrete position of the grasp point may be described as the property information beforehand.

The operator makes the cursor 3001 approach a mark located near the grasp point of the bolt by using the position input device 7 and gives a sign to the judging means 10 by using a button on the position input device 11. At this time, the cursor 3001 need not completely coincide with the mark. It is judged by the above described procedure that a mark located at the nearest position among marks located within a certain distance from the cursor 3001 when the sign is given has been selected. Thereby the judging means 10 judges that the operator has selected a bolt. The display changing means 12 makes the cursor 3001 coincide with the position of the grasp point and also eliminate other marks. The display changing means 12 changes the color of the bolt to signify the operator that the bolt has been selected. On the basis of the result of this selection, the action interpreter 5 rewrites the structure information 201 and 203 of the robot and objects included in the work space map 2 so that the information may represent the state in which the bolt leaves the floor surface and is held by the gripper of the robot. This is achieved by rewriting the link 2132 shown in FIG. 4 so as to replace "floor, on" with "gripper, fixed" and rewriting the position and posture parameter correspondingly. If the cursor 3001 is thereafter moved on the screen, therefore, not only the robot but also the bolt is displayed to move with the gripper of the robot. Further, the action interpreter 5 writes into the structure information 201 of robot the information that the robot has held the bolt.

Figure 9:
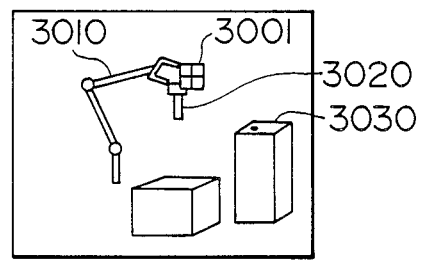

Then the operator can specify the path, along which the bolt is to be carried, at a certain number of points. For the purpose of specification, the operator moves the cursor 3001 to a suitable position and gives a sign by the character input device 6 to the action interpreter 5. Thereby that position is registered as a path point (FIG. 9). And the operator gives a sign meaning the completion of the path point specification to the action interpreter 5 by the character input device 6, thus the specification of the path point being finished. If the operator need not specify path points, the operator may give a sign meaning completion of the path point at the beginning.

Figure 10:
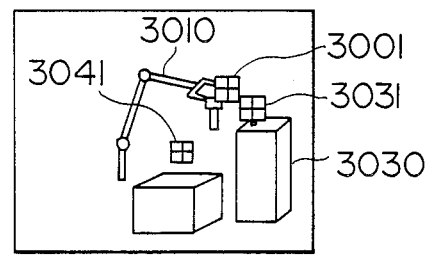

Lastly the action interpreter 5 derives "PUT POINT" from the objects property information 204 on the basis of the remaining description of the description 311 and displays it with a mark 3041 on the screen. The "PUT POINT" means a position where the bolt can be placed or mounted. On the basis of the robot structure information 201, the action interpreter device 5 knows that the robot holds the bolt at that time. Therefore, the action interpreter 5 derives only "PUT POINTS" relating to the bolt out of "PUT POINTS" for other various objects and displays them (FIG. 10).

The operator makes the cursor 3001 approach a "PUT POINT" of the desired part and sends a sign to the judging means 10 by the button input device 11. In accordance with the same procedure as the foregoing one, the judging means 10 judges the mounting position. The display changing means 12 aligns the bolt with that position, and restores the bolt to the original color. The action interpreter 5 rewrites the robot and objects structure information 201 and 203 included in the work space map 2 so as to represent the state in which the bolt leaves the gripper and is fixed at the mounting position. With respect to a motion of the cursor 3001, therefore, only the robot 3010 moves on the screen thereafter, and the bolt is displayed fixed at the mounting position.

When the processing heretofore described has been finished, the action interpreter 5 generates an action message such as carry (obj 1, path, obj 2) by using the action name "CARRY", a symbol "obj 1" bound to the names of the bolt and the "GRASP POINT" a symbol "obj 2" bound to the names of the part whereto the bolt is to be attached and the "PUT POINT", and a symbol "PATH" bound to the path points. The action interpreter 5 transfers the action message to the motion generator 13. Upon receiving the action message from the action interpreter 5, the motion generator 13 restores the work space map to its state of step 32 shown in FIG. 6 by using the stack 205. The motion generator 13 looks for description relating to "carry" in the motion generation knowledge 302 as shown in FIG. 11, and breaks down "carry (A, P, B)" into "take (A)", "path (P)" and "put (B)". At this time, the symbols obj 1 and obj 2 are substituted into the arguments A an B. The description "take (A)" is further broken down into "grasp (A)" or "detach (A)". Since it is known from the objects structure information 203 that the bolt specified by "obj 1" is not attached to another object, however, "grasp (A)" is chosen. As for "put (A)", it is known from the objects structure information 203 that "obj 2" is the position whereat the bolt is mounted. Therefore, "attach (A)", which means a motion of attaching the bolt screwing, rather than "put on (A)", which means a motion of simply placing the bolt on the object, is chosen. The motion "grasp (A)" is further broken down into detailed motions of moving the gripper to the vicinity of the bolt, taking the gripper to the holding position slowly, closing the gripper, and moving the gripper right above. In order to derive the position coordinates of the object depending upon a change caused in the object position with the progress of motion from the robot and objects structure information 201 and 203, the structure information 201 and 203 is rewritten along the generation of the motion. The motion data including detailed coordinate values is gererated from the action message via particularization heretofore desribed.

The motion data generated by the motion generator 13 is temporarily stored in the motion generator 13, and transferred to either the robot 1 or the simulator 15 via the switch 14. If the operator wants to know whether the generated motion data are proper or not, the operator is able to send them to the simulator 15 and perform dynamics simulation. By using the weight of the robot, its moment of inertia, the coefficient of friction of a revolute joint, and so on stored in the robot property information 202, the equation of motion for moving the robot with motion data is numerically solved, and the result is displayed as motions of the robot 3010 on the screen of the display device 4. In order to grasp the movement of the object with the progress of motion in this display as well, the work space map is restored to the state of the step 32 illustrated in FIG. 6 by the stack 205. With the progress of motion, the robot and object structure information 201 and 203 are rewritten.

If there is no problem in the result of simulation, the operator sets the switch 14 to the robot 1 side and moves the actual robot 1 with the motion data stored in the motion generator 13. If the result of simulation indicates that the robot might coincide with an obstacle on the way of carriage of the bolt 2030 to the position of the part 3030 by the robot under the situation shown in FIGS. 7 to 10, for example, the operator gives modified directive of motion such as modified specification of path points.

Since the actual object existing in the work space is not always located at a position stored in the work space map, it is necessary to correct discrepancy between the position on the map and the actual position. For the motions requiring precise alignment with respect to an object such as motions grasping the object, for example, the correction just described is achieved by introducing motions of approaching the object while the distance from the object is being measured by means of a distance sensor in the breaking down process written in the motion generation knowledge 302 and by adding information relating to the use of the sensor to the motion data. When the robot actually moves, the robot can move while the discrepancy with respect to the map is being corrected by means of the sensor. When abnormality is sensed by means of the sensor or the like, during the course of the motion of the robot, the motion is stopped, and that fact is displayed on the screen of the display device 4 by means of characters or the like.

In the present embodiment, the operator need provide neither concrete coordinate value data nor accurate position information to provide the robot with motions. The operator need only specify principal points of working by selecting reference points successively displayed. Therefore, the operator can simply provide the robot with motions in a very short time. Further, motions can be confirmed beforehand by using simulation with due regard to dynamics, and hence the safe manual operation is assured.

The operator can try various motions beforehand while repeating observation of simulation results and amendments of motions depending thereupon. Therefore, the operator can find motions meeting the wish of the operator to the highest degree out of motions thus tried. If the action message is preserved, it is possible to give the motions to robots of various shapes with the identical action message by only interchanging the robot structure information 201.

By the motion of the robot 3010 on the screen interlocked with the input of the position input device 7, the opertor is able to intuitively know what posture the robot assumes or what is the movable range depending upon the position of the gripper. Information effeicient in considering the action procedure can thus be given efficiently.

Since motions can be simply given in a very short time, the present embodiment can be used not only for teaching a robot which performs repetitive working such as an industrial robot but also manual operating a robot in a construction field in an interactive way.

Since the arrangement of objects in the operation environment is displayed on the screen and the manual operating system can be placed at a distance from the robot, the present embodiment can also be used for remote manual operation of a robot in an environment a person cannot enter such as an atomic power plant.

Every time an action message is generated, motion data generation process is performed in the above described embodiment. After action messages are accumlated to some degree, however, motion data may be generated together from them.

Further if a place for preserving those action messages and a mechanism capable of editing and managing those action messages are prepared, motions of the robot can be edited and managed at the action level. Therefore, the manual operator can establish a motion plan of a higher degree.

If it is permitted to put together some action messages to define a new action message, it is possible to simply direct action of higher degree.

In the above described embodiment, the path for carrying an object is given simply as points. If these points are provided with an attribute that the path may pass through the vicinity of the point or an attribute that the path must pass through the point accurately, for example, more complicated working directives can be given.

If the present system is used in construction of a plant, for example, and the plant is designed by using CAD, it is also possible to derive information for the objects structure information in the work space map 1 from data of that CAD. Further, if parts handled by the robot are limited, it is also possible to make and modify the work space map by a visual recognition device.

Figure 12:
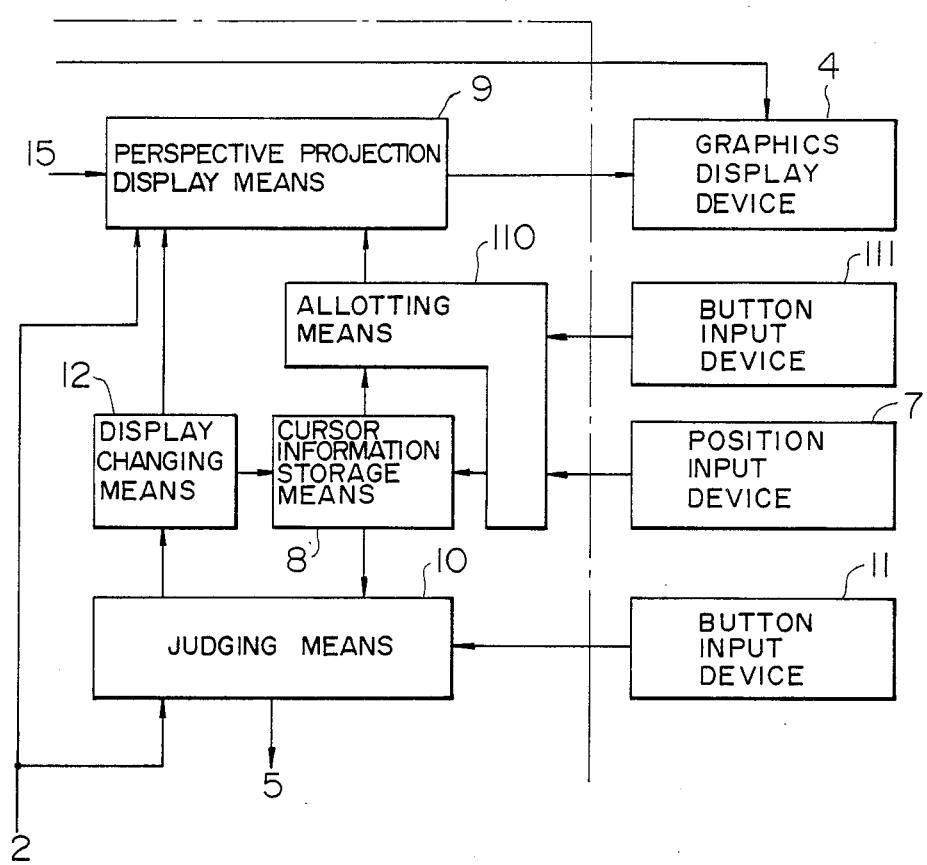
FIG. 12 is a configuration diagram showing another example of a system according to the present invention.

In a present invention system, it is also possible to use 2-dimensional position input device instead of 3-dimensional one by providing allotting means 110 between the cursor information storage means 8 and the position input device 7 as well as between the cursor information storage means 8 and the perspective projection display means 9 and providing a second button input device 111 different from the button input device 11 as shown in FIG. 12.

Figure 13:
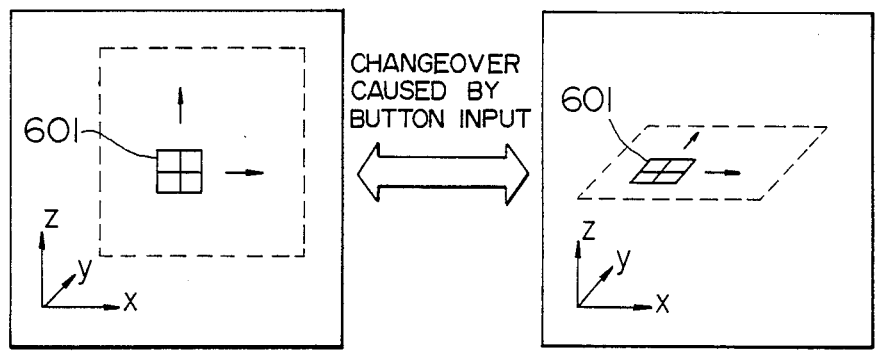
FIG. 13 shows a change of cursor shape in the example shown in FIG. 12.

The second button input device 111 is provided on the position input device 7 in the same way as the first button input device 11. The allotting means 110 performs changeover to add displacements Δx and Δy respectively in x and y axis directions supplied from the position input device 7 either x and y coordinate values or to x and z coordinate values, and performs changeover to specify the one of two types of shape data for the cursor is used in displaying the cursor on the screen. The changeover operation is performed whenever the button input device 111 is supplied with input. For every button depression on the button input device 111, therefore, the constraint plane on which the cursor is movable is changed over between the x-y plane and the x-z plane, and at the same time shapes of the displayed cursor and marks are changed as shown in FIG. 13. Even if a two-dimensional position input device is used, therefore, it is possible to change the position of the cursor in a three-dimensional way. Further, since the shape of the cursor changes whenever the constraint plane on which the cursor can move is changed over, the operator is able to know which direction the cursor moves in and spatially perceive the constraint plane.

Owing to the present invention, three-dimensionally arranged objects can be selected by only moving the cursor three-dimensionally displayed on the screen and roughly matching the position and size of a cursor with those of a mark affixed to an object. Therefore, a desired object can be easily selected, and the selection can be made easy to understand.

In the present invention system, the operator can see the movement of an object corresponding to a motion of the robot. Therefore, the motion situation of the robot including the movement of the object to be handled can be accurately verified. As a result, it is possible to obtain information which is efficient for the operator to establish a plan of motions.

Since the object to be handled moves in accordance with motions of the robot, it is possible to confirm on the screen during teaching whether interference between the object held by the gripper of the robot and another such as an obstacle is present or not.

Even if a mistake is made on the way of teaching, it is possible to try the teaching again from the state immediately preceding the mistake without trying the whole from the start again owing to the function of the stack. Thereby it is possible to establish a motion plan in a trial and error fashion.

In a map according to the present invention, the position of an object is represented by a treelike hierarchical structure. By only rewriting the position and posture parameter A2 of body shown in FIG. 2, for example, not only the position and posture of body but also those of cap placed on the body change. The movement of an object in the actual world can thus be represented efficiently.

We claim:

1. In an operation system having a graphic display means for displaying patterns on a screen and operating patterns of objects displayed on the screen, said system comprising:

position input means for producing displacements in directions of X, Y and Z axes in a three-dimensional space;

cursor information storage means for storing three-dimensional position data and shape data of a cursor and rewriting data stored therein response to displacements produced by said input means;

object information storage means for storing three-dimensional position data and shape data of objects and storing position data of a mark which is provided for each object to spatially designate a location of the object;

perspective converting projection display control means for referring to three-dimensional position data and shape data of the cursor stored in said cursor information storage means, converting the three-dimensional position data into converted three-dimensional position data for use in perspective projection of a converted cursor onto said screeen and generating display signals to display the converted cursor at a converted position indicated by the converted three-dimensional position data and with a size corresponding to a converted position on said screen, said projection display control means further refers to the three-dimensional position data and shape data of the objects and the position data of the mark positions stored in said object information storage means, converts the three-dimensional position data and shape data of the objects and the position data of the marks into converted three-dimensional position data and shape data of converted objects and converted position data of converted marks for use in perspective projection of the converted objects and converted marks onto said screen and generating display signals to display respective converted objects and marks at converted positions and with converted shapes and sizes corresponding to the converted positions on said screen, and display signals being outputted to said graphic display means;

means for generating a trigger signal; and judging means, responsive to the trigger signal, for comparing current three-dimensional position data of said cursor information storage means and current position data of a current mark of said object information storage means in order to detect differences not larger than predetermined values to thereby select an object corresponding to a mark with the detected differences;

wherein said objects are to be operated by a robot; and said system further including action knowledge having a collection of robot operating steps of said robot; and action interpretation means for referring to said action knowledge and instructing said object information storage means to display marks respectively provided at only objects able to be selected by said robot per each of said operating steps.

2. A system according to claim 1, further comprising display changing means responsive to the object selection of said judging means for applying an instruction signal to change display of said selected object to said projection display control means.

3. A system according to claim 1, wherein said object information storage means stores data of a robot struture; and said projection display control means reads the robot structure data and enables a perspective projection display of the robot in a posture having a gripper put at a position of said cursor and being changed in interlocking relation with movements of said cursor to thereby cause easier identification of three-dimensional moving directions of said cursor.

4. In an operation system having a graphic display means for displaying patterns on a screen and operating patterns of objects displayed on the screen, said system comprising:

position input means for producing displacements in directions of X, Y and Z axes in a three-dimensional space;

cursor information storage means for storing three-dimensional position data and shape data of a cursor and rewriting data stored therein in response to displacements produced by said input means;

object information storage means for storing three-dimensional position data and shape data of objects and storing position data of a mark which is provided for each object to spatially designate a location of the object;

perspective converting projection display control means for referring to three-dimensional position data and shape data of the cursor stored in said cursor information storage means, converting the three-dimensional position data into converted three-dimensional position data for use in perspective projection of a converted cursor onto said screen and generating display signals to display the converted cursor at a converted position indicated by the converted three-dimensional position data and with a size corresponding to a converted position on said screen, said projection display control means further refers to the three-dimensional position data and shape data of the objects and the position data of the mark positions stored in said object information storage means, converts the three-dimensional position data and data of the objects and the position data of the marks into converted three-dimensional position data and shape data of converted objects and converted position data of converted marks for use in perspective projection of the converted objects and converted marks onto said screen and generating display signals to display respective converted objects and marks at converted positions and with converted shapes and sizes corresponding to the converted positions on said screen, and display signals being outputted to said graphic display means;

means for generating a trigger signal;

judging means, responsive to the trigger signal, for comparing current three-dimensional position data of said cursor information storage means and current position data of a current mark of said object information storage means in order to detect differences not larger than predetermined values to thereby select an object corresponding to a mark with the detected differences;

an action interpreter for judging action intention of an operator's operation from an action name inputted via character input means and operation of a locomotive object responsive to said position input means and displaced on said screen, for displaying necessary reference points successively and for generating an action message conforming to action intention;

a motion generator for converting the generated action message to motion data suitable for driving the locomotive object; and work space map means and action knowledge means both for supplying information required by said action interpreter and said motion generator.

5. A system according to claim 4, further comprising:

a changeover switch disposed on a way of delivery of motion data from said motion generator to said locomotive object; and means for performing simulation by using a dynamics simulator before actually driving the locomotive object, for displaying the result of simulation on the screen of said graphics display means, for confirming validity of the motion.

6. A system according to claim 5, wherein the locomotive object is a robot for transporting goods.

7. A system according to claim 4, wherein the locomotive object is a robot for transporting goods.

8. A system according to claim 4, wherein the position data of said objects are stored in said work space map means in accordance with a treelike structure formed by relative positions and postures of objects as well as their linkage relations.

* * * * *